US007293972B2

(12) United States Patent
Torii et al.

(10) Patent No.: US 7,293,972 B2
(45) Date of Patent: Nov. 13, 2007

(54) MOLD FOR MOLDING ELECTRIC WIRE PROTECTION CAP

(75) Inventors: Chieko Torii, Shizuoka (JP); Takayuki Yamamoto, Shizuoka (JP); Masato Ozawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 122 days.

(21) Appl. No.: 11/176,240

(22) Filed: Jul. 8, 2005

(65) Prior Publication Data

US 2006/0009085 A1 Jan. 12, 2006

(30) Foreign Application Priority Data

Jul. 9, 2004 (JP) ............................. 2004-202968

(51) Int. Cl.
*B29C 33/44* (2006.01)

(52) U.S. Cl. ...................... 425/190; 425/438; 425/577; 249/184

(58) Field of Classification Search ................ 425/577, 425/438, 468, 190, 591, 595, 441; 249/184, 249/121, 137, 144, 96
See application file for complete search history.

(56) References Cited

U.S. PATENT DOCUMENTS 2,890,490 A * 6/1959 Morin ........................ 249/144
3,284,853 A * 11/1966 Moneymaker et al. ...... 425/123
4,157,806 A * 6/1979 Bourdon et al. ............ 249/184
4,378,103 A * 3/1983 Sanford et al. ............. 249/184
4,861,257 A * 8/1989 Siotani ....................... 425/438
5,200,209 A * 4/1993 Nattel et al. ................ 425/577
5,540,582 A * 7/1996 Catalanotti et al. ......... 425/577
5,630,977 A * 5/1997 Catalanotti et al. ......... 264/318
6,023,894 A * 2/2000 Sorkin ....................... 52/223.8

FOREIGN PATENT DOCUMENTS

JP 8-22847 1/1996

* cited by examiner

*Primary Examiner*—James P. Mackey
*Assistant Examiner*—Dimple Bodawala
(74) *Attorney, Agent, or Firm*—Kratz, Quintos & Hanson, LLP

(57) ABSTRACT

The mold for molding an electric wire protection cap includes an outer mold and an inner mold for forming a cap body of the electric wire protection cap, the inner mold including a first mold member and a second mold member, the first mold member including a projecting wall and a shaft, the second mold member including a notch for fitting the projecting wall thereinto and a hole for passing the shaft therethrough, wherein a gap for forming a locking lance is formed between an end surface of the projecting wall and an end surface of the notch, the second mold member can come off along the shaft, and the first mold member is rotatable around the shaft.

6 Claims, 4 Drawing Sheets

MOLD FOR MOLDING ELECTRIC WIRE PROTECTION CAP

BACKGROUND OF THE INVENTION (1) Field of the Invention

The present invention relates to a mold for molding an electric wire protection cap for manufacturing the electric wire protection cap made of synthetic resin, which protects a joint part of electric wires in a wiring harness and so on from the outside.

(2) Description of the Related Art

FIG. 9 shows an example of a conventional electric wire protection cap (referring to Japanese Patent Application Laid-Open No. H8-22847; pages 3-4 and FIG. 1).

An electric wire protection cap 61 is for insulating and waterproof-protecting a joint part 66 of electric wires 67 in a wiring harness. The electric wire protection cap 61 is made of synthetic resin and integrally includes a cap body 62 having a bottom and a plurality of flexible locking lances 63 arranged in the cap body 62.

Upon molding of the resin, each locking lances 63 is projectingly formed outward from an open end 64 of the cap body 62 through a thin hinge 65 and after the molding each locking lances 63 is folded back into the inside of the cap body 62. Such a procedure is needed for enabling a mold release upon molding of the locking lances 63.

Insulating coatings of ends of a plurality of electric wires 67 are stripped off so as to expose core wires and the core wires are crimped by a sleeve made of electrically conductive metal, thereby forming the joint part 66. An end of the locking lance 63 abuts against a rear end of the sleeve so as to prevent the joint part 66 from coming out.

In a conventional process for molding the electric wire protection cap 61, a ring-shaped gap for forming the cap body 62 is formed between molds situated top and bottom, a short gap for forming a thin hinge 65 and a rectangular recess for forming a plurality of the locking lances are continuously formed continuing to the ring-shaped gap outside the cap body 62, then molten resin is injected into between the molds and the resin is solidified and then, the molds are parted from each other so that the molded electric wire protection cap is taken out.

However, in the conventional process for molding the electric wire protection cap 61 as described above, since the locking lances 63 are folded back after the molding, strength of the thin hinge 65 might be deteriorated, labor and man-hour is needed, and the thin hinge 65 is hardly filled with the molten resin upon the molding, resulting in that the strength of the hinge 65 might be deteriorated.

SUMMARY OF THE INVENTION

It is therefore an objective of the present invention to solve the above problem and to provide a mold for molding an electric wire protection cap, by which the locking lances do not necessitate being folded back, reliability of the locking lance is improved, and the molding can be securely carried out.

In order to attain the above objective, the present invention is to provide a mold for molding an electric wire protection cap including an outer mold and an inner mold for forming a cap body of the electric wire protection cap, the inner mold including a first mold member and a second mold member, the first mold member including a projecting wall and a shaft, the second mold member including a notch for fitting the projecting wall thereinto and a hole for passing the shaft therethrough, wherein a gap for forming a locking lance is formed between an end surface of the projecting wall and an end surface of the notch, the second mold member can come off along the shaft, and the first mold member is rotatable around the shaft.

With the construction described above, the cap body of the electric wire protection cap is molded within a closed space between the outer and inner molds, and the locking lance is molded between the end surface of the projecting wall of the first mold member and the end surface of the notch of the second mold member. The locking lance has flexibility and locks an electric wire joint (i.e. joint part of electric wires) within the cap body. After the molding, the second mold member is drawn out (i.e. pulled out) to be parted from the first mold member in the direction of the shaft, in such a state the first mold member is rotated in the circumferential direction around the shaft, so that an inclined surface of the projecting wall is parted from the locking lance in the circumferential direction, thereby the first mold member can be drawn out without interfering with the locking lance.

Since the first mold member can be drawn out without interfering with the locking lance of the electric wire protection cap, the locking lance can be integrally formed on an inner side surface of the cap body, so that the strength of the locking lance at a root thereof is increased, thereby preventing the locking lance from being damaged and increasing locking force of the locking lance to the electric wire joint.

Preferably, a plurality of the projecting walls and a plurality of the notches are formed on a circumference.

With the construction described above, a plurality of the locking lances are simultaneously molded on an inner circumferential surface of the cap body. The locking force to the electric wire joint is increased with a plurality of the locking lances. Thus, stability of the locking is increased. Preferably, a plurality of the locking lances are formed having the same distance between one and another.

Preferably, the end surface of the projecting wall and the end surface of the notch are inclined surfaces.

With the construction described above, the inclined shape locking lance is molded between the inclined surface of the projecting wall and the inclined surface of the notch. Preferably, the locking lance is inclined toward an end of the cap body. The reverse may be possible. The locking lance bends outwardly so as to pass the electric wire joint there, while the locking lance bends back inwardly so as to lock the electric wire joint. A space for bending is formed between the locking lance and the cap body. The space for bending is formed between an inclined surface of the first mold member and an outer circumferential surface of the projecting wall.

With the construction described above, the inclined locking lance can be molded, the electric wire joint can be smoothly inserted into the cap body, and the locking force of the locking lance to the electric wire joint can be increased.

Preferably, the inclined surface of the projecting wall continues to a recess groove which forms an end of the locking lance.

With the construction described above, for example, an end of the locking lance is molded straight in the shaft direction of the cap within the recess groove in the shaft direction. The locking lance is formed in a bent shape including an inclined shape part and a short end part extending straight in the shaft direction. The electric wire joint is smoothly inserted along the straight end part and strong locking force is brought about by the straight end part.

With the construction described above, the straight end part can be molded at an end of the inclined locking lance, the electric wire joint can be more smoothly inserted into the cap body, and the locking force of the locking lance to the electric wire joint can be greatly increased.

Preferably, a recess is formed on a side surface of the projecting wall or a side surface of the notch, whereby a rib for positioning an electric wire joint is formed by the recess.

With the construction described above, the rib for positioning the electric wire joint is molded by the recess on the side surface of the projecting wall or the side surface of the notch. The electric wire joint is inserted inside the rib and centered at the center of the cap body without looseness in the radial direction, so that the locking lance can carry out the secure and stable locking. Since the first mold member is rotated in a reverse direction to the recess, the first mold member can be drawn out without interfering with the rib.

With the construction described above, the locking lance and the rib can be simultaneously molded. The electric wire joint is centered by the rib, so that the electric wire joint is securely locked by the locking lance.

Preferably, the second mold member includes a flange for forming an open end of the cap body.

With the construction described above, the cap body is molded between the flange of the second mold member and a hole part having a bottom of the outer mold. With the flange, the open end surface of the cap body is formed. With the flange, the open end of the cap body can be nicely formed.

DESCRIPTION OF THE PREFERRED EMBODIMENTS

In the following, preferred embodiments of the present invention will be explained with reference to the attached drawings.

Figure 1:
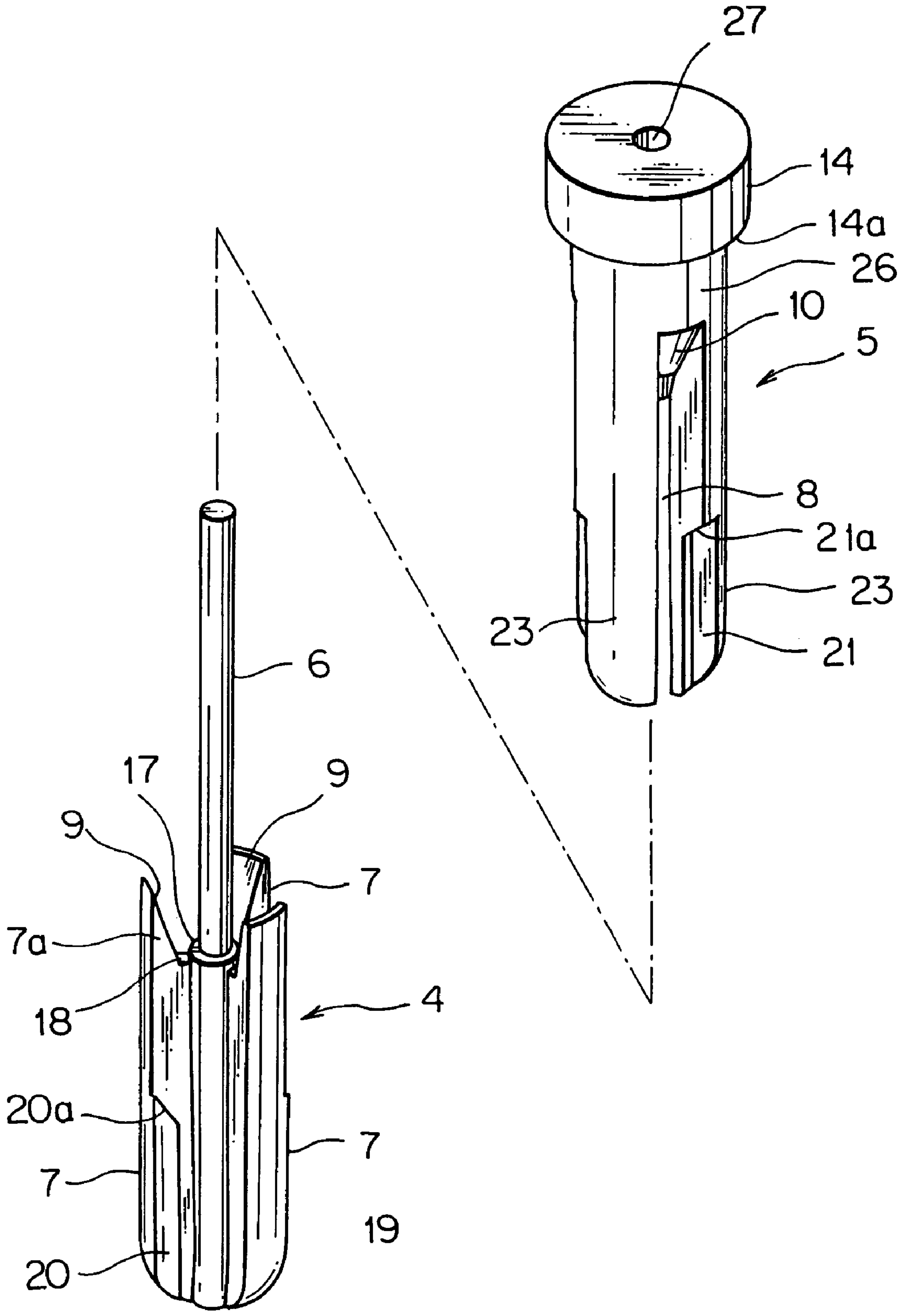
FIG. 1 is an exploded perspective view illustrating a primary part of an preferred embodiment of a mold for molding an electric wire protection cap according to the present invention.
Figure 2:
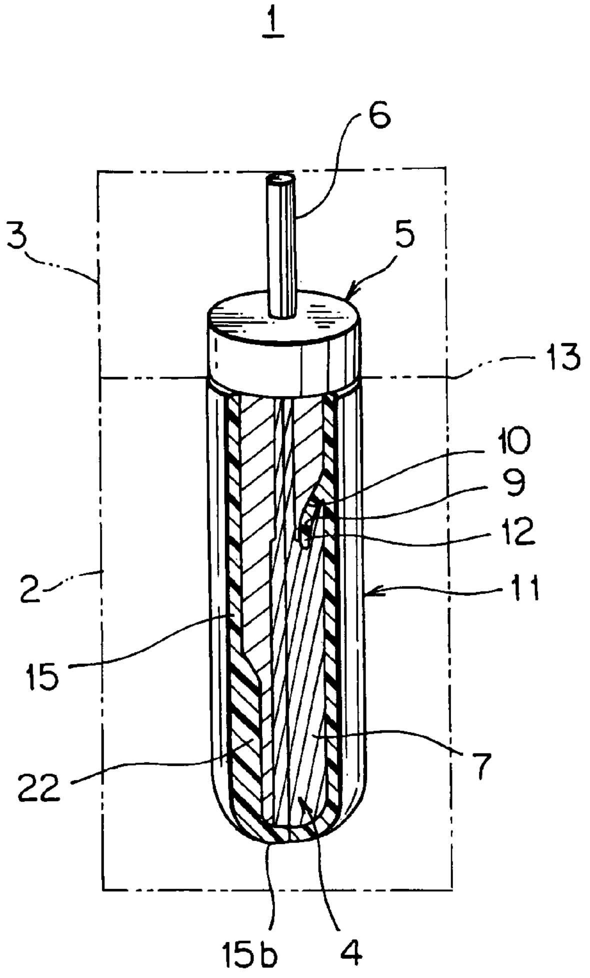
FIG. 2 is a notched perspective view illustrating a state when an electric wire protection cap is molded by using the mold.
Figure 3:
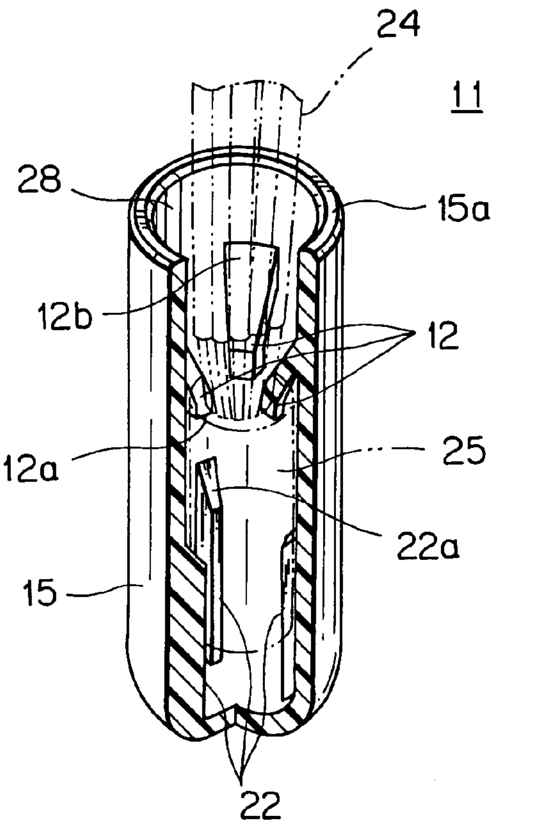
FIG. 3 is a notched perspective view illustrating a molded electric wire protection cap.

FIGS. 1 and 2 show a mold for molding an electric wire protection cap according to the present invention. FIG. 3 shows an electric wire protection cap molded by using the mold.

The mold 1 (shown in FIG. 2) includes as an outer mold a lower fixed mold 2 and an upper movable mold 3, both made of metal, the upper movable mold 3 includes as an inner mold a first mold member 4 and a second mold member 5, which are divided top and bottom, wherein the first mold member 4 is rotatable with a specific angle around a shaft 6 with respect to the second mold member 5 that is parted from the first mold member 4 upwardly, the first mold member 4 includes a plurality of (three in this example) projecting walls 7 in the radial direction, the second mold member 5 includes a plurality of (three in this example) notches 8 for fitting and receiving the respective projecting walls 7 thereinto, so that an electric wire protection cap 11 can be provided with a flexible locking lance 12 that is formed by molding between an end surface 9 of the projecting wall 7 and an end surface 10 of the notch 8.

The lower fixed mold 2 (shown in FIG. 2) has a known form, which forms a ring-shaped gap between the lower fixed mold 2 and an outer circumferential surface of both mold members 4 and 5 and has a deep round hole having a bottom. A lower end surface 14*a* of a round flange 14 situated at an upper end of the second mold member 5 is located on a division surface 13 between the fixed mold 2 and a movable body (3).

The flange 14 closes the hole of the fixed mold 2 so as to determine the position of an open end 15*a* of a cap body 15 of the electric wire protection cap 11. The movable mold 3 moves in one piece with the flange 14 of the second mold member 5. The first mold member 4 and the second mold member 5 compose an inner mold 16 which is a primary part of the movable mold 3.

The first mold member 4 (shown in FIG. 1) includes: a cylindrical center part 17 that continues to the bottom of the central perpendicular shaft 6; and the perpendicular projecting walls 7 that project in the radial direction from the center part 17 being arranged in the circumferential direction having the same distance between one and another. Each projecting wall 7 is formed in longitudinally long plate-shape and a fan-shape in cross section and has an inclined surface 9 extending inwardly at an upper end of the projecting wall 7, wherein the inclined surface 9 forms a wedge-shaped part 7*a* of the projecting wall 7 projecting upwardly, a lower end of the inclined surface 9 continues to a horizontal short plane 18 crossing therewith, the short plane 18 crosses at right angles with the center part 17, thereby forming a recess groove (18) between the inclined surface 9 and the center part 17.

Upon molding, a lower surface of the locking lance 12 (shown in FIG. 3) is situated on an upper side of the inclined surface 9 and an end 12*a* of the locking lance 12 is situated within a recess groove 18. A groove-shaped space 19 having a fan-shape in cross section is formed between the respective projecting walls 7.

At the bottom half of a side surface of each projecting wall 7, a low projection 20 is integrally formed from the outer circumferential surface of the projecting wall 7 toward the center. A recess 21 deeper than the projection 20 is formed being notched on a side surface of the notch 8 of the second mold member 5 facing to the projection 20. The projection 20 enters into the recess 21 so as to close the recess 21, so that a rib for positioning the electric wire protection cap 11 (shown in FIG. 3) is molded in the recess 21. Upper end surfaces 20*a* and 21*a* of the projection 20 and the recess 21, respectively, are inclined surfaces extending outwardly. The recess 21 communicates with an outer circumferential surface and lower side surface of a wall part 23 which is adjacent to the notch 8. The positioning rib 22

(shown in FIG. 3) positions a sleeve made of electrically conductive metal, which is a joint part 25 of electric wires 24, without looseness in the radial direction.

Figure 4:
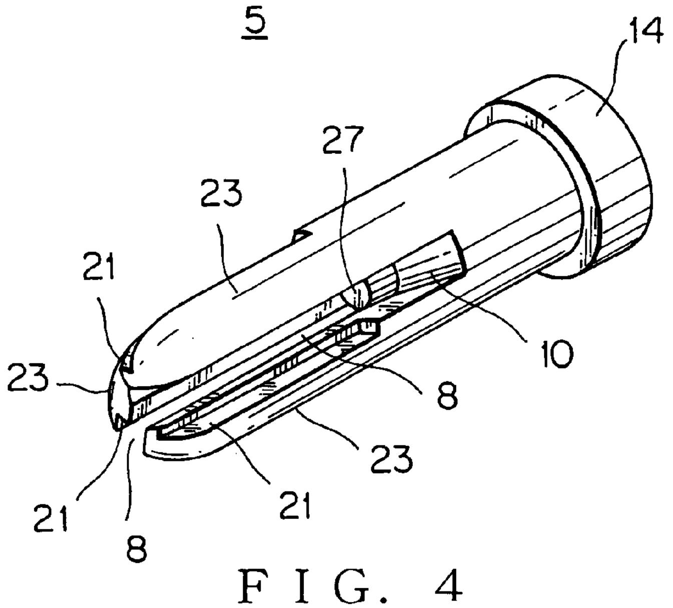
FIG. 4 is a perspective view illustrating the second mold member of the mold.

As shown in FIGS. 1 and 4, the second mold member 5 is adjacent to each notch 8 having a fan-shape in cross section and includes three wall parts 23 having a fan-shape in cross section. An inclined surface 10 is formed at an upper end of the notch 8. The inclined surface 10 faces the inclined surface 9 of the first mold member 4 having a gap therebetween. The locking lance 12 is molded between the inclined surfaces 9 and 10, and an upper surface of the locking lance 12 is situated at a lower side of the inclined surface 10.

The inclined surface 10 continues to an upper ring-shaped wall part 26, an outer circumferential surface of the ring-shaped wall part 26 continues to the same surface with an outer circumferential surface of the three wall parts 23, the flange 14 continues to an upper side of the ring-shaped wall part 26, each projecting wall 7 of the first mold member 4 closely fits to the corresponding notch 8 without a gap in the circumferential direction except portions for forming the locking lance and the positioning rib, the outer circumferential surface of the three wall parts 23 matches with the outer circumferential surface of the respective projecting walls 7 so as to be cylindrical, and a gap for molding the cap body 15 is formed between an outer surface of the cylinder and an inner surface of a hole part of the fixed mold 2 (shown in FIG. 2).

A hole 27 for passing the shaft 6 of the first mold member 4 therethrough is formed penetratingly up and down at the center of the second mold member 5. The hole 27 communicates with the notches 8 situated in three directions. Ends (lower ends) of the three wall parts 23, ends (lower ends) of the projecting walls 7 of the first mold member 4 and a bottom surface of the hole of the fixed mold 2 (shown in FIG. 2) are smooth curved surfaces so as to form a bottom surface 15*b* of the electric wire protection cap 11.

Figure 5:
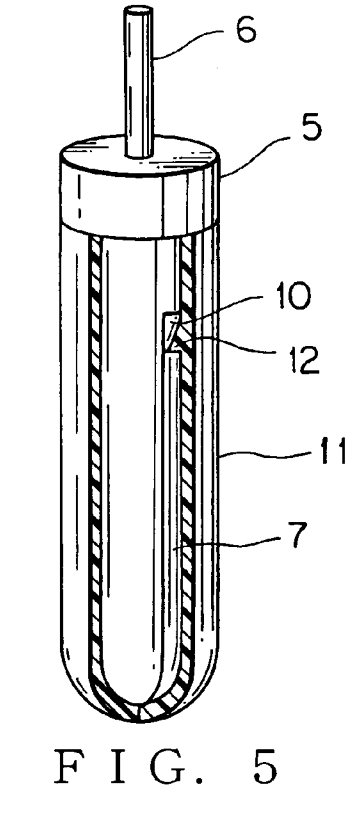
FIG. 5 is another notched perspective view illustrating an electric wire protection cap molded by using the mold viewed from an angle different from that of FIG. 2.

In the following, a process for molding the electric wire protection cap 11 will be explained with reference to FIGS. 2 and 5-8. The illustration of the fixed mold 2 and the movable mold body 3 in FIG. 2 are omitted. FIG. 5 is another notched perspective view illustrating an electric wire protection cap molded by using the mold viewed from an angle different from that of FIG. 2. FIGS. 2, 3 and 5-8 illustrate the inside by notching a part of the electric wire protection cap 11.

In FIG. 2, the fixed mold 2 is provided with an injection inlet (not shown in the figure) for resin, from which the molten resin is supplied into a space between the fixed mold 2 and the first and second mold members 4, 5 that are the primary part of the movable mold 3. The locking lance 12 is formed between the inclined surface 9 of the projecting wall 7 of the first mold member 4 and the inclined surface 10 of the second mold member 5. The positioning rib 22 is formed between the projection 20 of the projecting wall 7 and the recess 21 of the wall part 23 of the second mold member 5.

Figure 6:
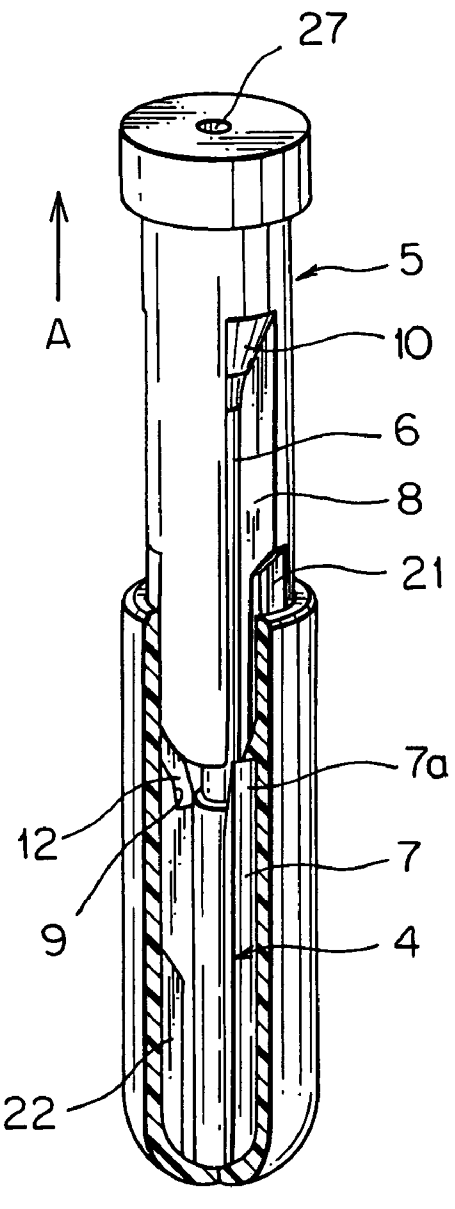
FIG. 6 is a notched perspective view illustrating a state when the second mold member is being drawn out after molding.

After the resin is injected, the injected resin is solidified by natural cooling. When the resin is solidified in FIG. 2 and 5, the second mold member 5 is lifted up along the shaft 6 of the first mold member 4 in a direction of an arrow A as shown in FIG. 6, so that the notch 8 of the second mold member 5 is parted from the projecting wall 7 of the first mold member 4 in the direction of the shaft. The second mold member 5 is lifted up integrally with the movable mold 3 (see FIG. 2).

Figure 7:
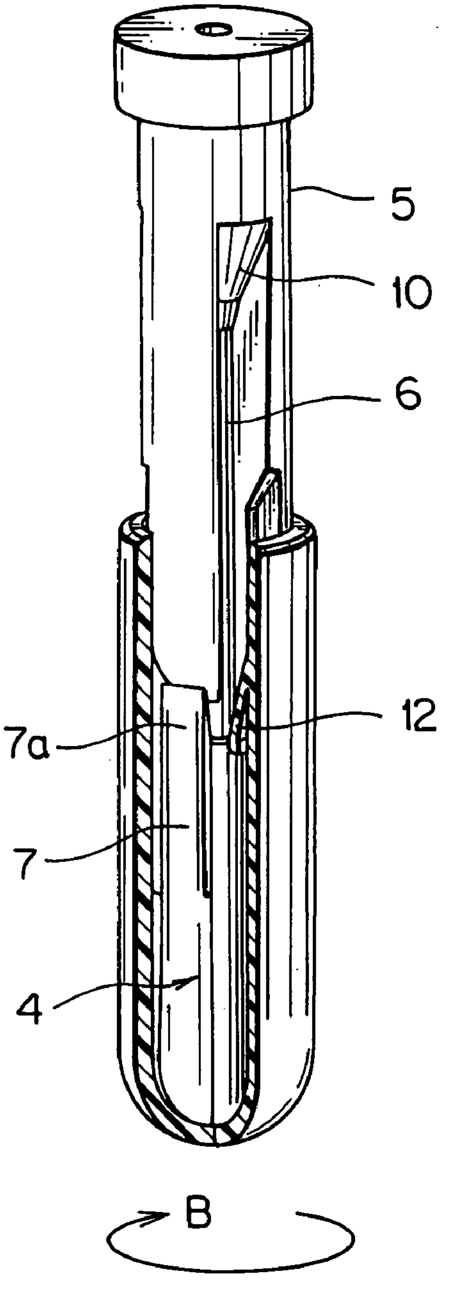
FIG. 7 is a notched perspective view illustrating a state when the first mold member is rotated.

Then, as shown in FIG. 7, the shaft 6 is rotated so as to rotate the first mold member 4 in a direction of an arrow B, for example by about 60°, so that the inclined surface 9 of the projecting wall 7 is shifted in the circumferential direction from the locking lance 12. The value of 60° is obtained as follows: first, 360° is divided by 3, which is the number of the locking lances 12, to obtain 120°, then this 120° is divided by 2. The rotation angle of the first mold member 4 is not limited to 60° and may be at least the minimum angle for parting the projecting wall 7 from the locking lance 12 in the circumferential direction.

The rotation direction of the first mold member 4 is a direction in which the projecting wall 7 is parted from the positioning rib 22 in the 25 circumferential direction. Since the rib 22 is formed only at one side of the projecting wall 7, therefore an interference between the rib 22 and the projecting wall 7 can be prevented from occurring by rotating the projecting wall 7 to the opposite side.

Figure 8:
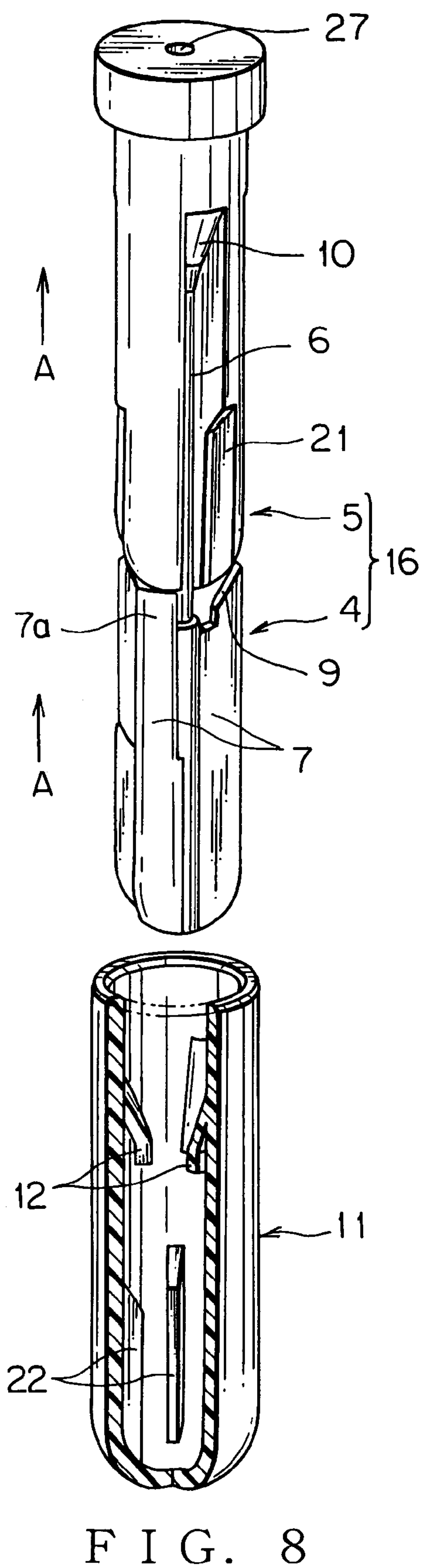
FIG. 8 is a notched perspective view illustrating a state when the first and second mold members are drawn out.
Figure 9:
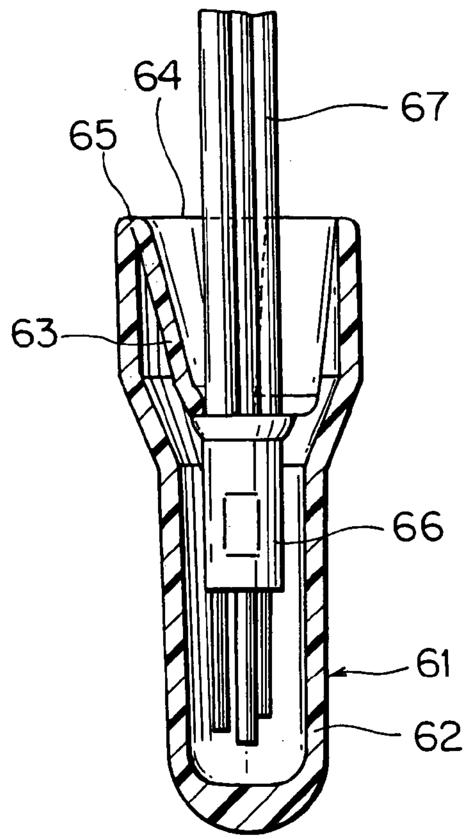
PRIOR ART FIG. 9
FIG. 9 is a longitudinal cross sectional view illustrating an example of a conventional electric wire protection cap.

On a condition that the locking lance 12 is parted from the projecting wall 7 in the circumferential direction, as shown in FIG. 8, the first and second mold members 4 and 5 of the inner mold 16 are drawn out from the fixed mold 2 (see FIG. 2) in a direction of an arrow A, thereby obtaining the electric wire protection cap 11 at an inner side of the fixing mold 2. The electric wire protection cap 11 is taken out from the fixing mold 2, for example, by pressing it upwardly with pressing means such as a pressing rod or air blower from the bottom of the fixing mold 2. In FIG. 8, for example, if a flange (not shown) is attached to an end of the shaft 6 and the flange is allowed to abut against an upper end surface of the hole 27 of the second mold member 5, the first mold member 4 can be integrally lifted up by an action of lifting of the second mold member 5.

As shown in FIG. 3, in the electric wire protection cap 11, a base end 12*b* of the locking lance 12 is situated on an inner circumferential surface of the cap body 15 at a slightly lower side of the opening 28. The locking lance 12 projects diagonally downwardly from the inner circumferential surface of the cap body 15. An end of the locking lance 12 is provided with a short end 12*a* extending straightly in the shaft direction, which is formed by the recess groove 18 (see FIG. 1) situated at the lower side of the inclined surface 9 of the projecting wall 7. The joint 25 of the electric wires 24 can be smoothly inserted into the cap body 15 along the end 12*a* of the locking lance 12 without being interfered. After the insertion, the joint 25 is securely locked by the end 12*a* of the locking lance 12.

Further, the rib 22 has a tapered surface 22*a* at an upper end thereof, so that the joint 25 of the electric wires 24 can be smoothly inserted into the inside of the rib along the tapered surface 22*a*. The joint 25 is centered by the respective ribs 22 so as to be situated at the center of the cap body 15, so that the end 12*a* of each locking lance 12 securely holds the joint 25 and locks the joint 25 tightly. An end of the joint 25 is situated closely to or contacting with the bottom of the cap body 15.

In the preferred embodiment described above, the projection 20 is formed on the side of the projecting wall 7 while the recess 21 is formed on the side of the notch 8 facing to the projection. However, instead, the projection 20 may not be provided and the recess 21 may be provided on one side of the projecting wall 7 or the notch 8 so that the recess 21 is closed with an opposite side of the projecting wall 7 or the notch 8.

The electric wire protection cap 11 may be filled with a filler such as urethane foam so as to improve waterproof property of the joint 25. Whether or not such a filler is filled may be decided depending on a place where the electric wire protection cap 11 is used. The sleeve that is the joint 25 may be uniformly crimped over the whole circumference thereof by using a swaging machine so as to form an outer circumferential surface of the sleeve smooth.

In the preferred embodiment described above, the three locking lances 12 are formed having the same distance between one and another. However, instead, a plurality of the locking lances 12 may be formed having the same distance between one and another. Even only one locking lance 12 can lock the joint 25. According to the number of the locking lances 12, the number of the projection walls 7 of the first mold member 4, the number of the notches 8 of the second mold member 5 and the number of the wall parts 23 of the second mold member 5 are determined. Preferably, the locking lance 12 is inclined forward toward the end of the cap body 15. However, instead, a short locking lance may be formed crossing at right angles with the inner surface of the cap body 15 or, alternatively, a locking lance may be formed inclined in the reverse direction. In such a case, a step for locking is simultaneously formed on an inner side of an end of the locking lance.

In the preferred embodiment described above, the fixed mold 2 is fixed and the first mold member 4 is rotated as shown in FIG. 7. However, instead, the fixed mold 2 may be rotated together with the electric wire protection cap 11.

In the preferred embodiment described above, the movable mold 3 is arranged up while the fixed mold 2 is arranged down. However, instead, to the contrary, the movable mold 3 may be arranged down while the fixed mold 2 may be arranged up. In such a case, a ring-shaped packing may be provided at the flange 14 of the second mold member 5 of the movable mold 3 so as to securely prevent the resin from leaking out. The material for the mold 1 may be various materials such as ceramic material besides metal.

What is claimed is:

1. A mold for molding an electric wire protection cap comprising an outer mold and an inner mold for forming a cap body of the electric wire protection cap, the inner mold including a first mold member and a second mold member, the first mold member including a projecting wall and a shaft, the second mold member including a notch for fitting the projecting wall thereinto and a hole for passing the shaft therethrough, wherein a gap for forming a locking lance is formed between an end surface of the projecting wall and an end surface of the notch, the second mold member can come off along the shaft, and the first mold member is rotatable around the shaft prior to complete separation of the first mold member from the second mold member.

2. The mold according to claim 1, wherein a plurality of the projecting walls and a plurality of the notches are formed on a circumference.

3. The mold according to claim 1, wherein the end surface of the projecting wall and the end surface of the notch are inclined surfaces.

4. The mold according to claim 3, wherein the inclined surface of the projecting wall continues to a recess groove which forms an end of the locking lance.

5. The mold according to claim 1, wherein a recess is formed on a side surface of the projecting wall or a side surface of the notch, whereby a rib for positioning an electric wire joint is formed by the recess.

6. The mold according to claim 1, wherein the second mold member includes a flange for forming an open end of the cap body.

* * * * *